(12) United States Patent
Li (10) Patent No.: US 9,179,216 B2
(45) Date of Patent: Nov. 3, 2015

(54) AUDIO INTERFACE ADAPTER DEVICE AND AUDIO SIGNAL RECEIVING APPARATUS

(71) Applicant: Tendyron Corporation, Beijing (CN)

(72) Inventor: Dongsheng Li, Beijing (CN)

(73) Assignee: Tendyron Corporation (CN)

( * ) Notice: Subject to any disclaimer, the term of this patent is extended or adjusted under 35 U.S.C. 154(b) by 0 days.

(21) Appl. No.: 14/347,433

(22) PCT Filed: Dec. 28, 2012

(86) PCT No.: PCT/CN2012/087889
§ 371 (c)(1),
(2) Date: Mar. 26, 2014

(87) PCT Pub. No.: WO2013/107271
PCT Pub. Date: Jul. 25, 2013

(65) Prior Publication Data
US 2015/0016624 A1   Jan. 15, 2015

(30) Foreign Application Priority Data
Jan. 18, 2012  (CN) .......................... 2012 1 0016852

(51) Int. Cl.
H04R 1/10 (2006.01)
H04R 3/00 (2006.01)
H04R 29/00 (2006.01)
G06F 3/16 (2006.01)

(52) U.S. Cl.
CPC ................. *H04R 3/00* (2013.01); *H04R 29/00* (2013.01); *H04R 29/002* (2013.01); *H04R 29/004* (2013.01); *G06F 3/162* (2013.01); *H04R 2420/00* (2013.01)

(58) Field of Classification Search
USPC .................. 381/1, 28, 74, 120, 122, 123, 309
See application file for complete search history.

(56) References Cited

U.S. PATENT DOCUMENTS

| 2007/0098184 A1* | 5/2007 | Ibe .................................. 381/77 |
| 2013/0142350 A1* | 6/2013 | Larsen et al. ................... 381/74 |
| 2013/0279713 A1* | 10/2013 | Xiao et al. ....................... 381/74 |

FOREIGN PATENT DOCUMENTS

| CN | 201438749 U | 4/2010 |
| CN | 101820566 A | 9/2010 |
| CN | 201673685 U | 12/2010 |
| CN | 102739183 A | 10/2012 |
| CN | 202721651 U | 2/2013 |

OTHER PUBLICATIONS

International Search Report for Application No. PCT/CN2012/087889 dated Apr. 4, 2013.

* cited by examiner

*Primary Examiner* — Vivian Chin
*Assistant Examiner* — Friedrich W Fahnert
(74) *Attorney, Agent, or Firm* — Lerner, David, Littenberg, Krumholz & Mentlik, LLP (57) ABSTRACT

An audio interface adapter device and an audio signal receiving apparatus are provided. The audio interface adapter device comprises an audio interface having a pin 1, a pin 2, a pin 3 and a pin 4. The pin 1 and/or the pin 2 is used as an audio pin of the audio interface. One of the pin 3 and the pin 4 is used as a microphone pin, and the other one of the pin 3 and the pin 4 is used as a ground pin. The audio pin is connected with the pin 3 via a first unidirectional conductive element, and connected with the pin 4 via a second unidirectional conductive element. A conductive direction of the first unidirectional conductive element is from the audio pin to the pin 3, and a conductive direction of the second unidirectional conductive element is from the audio pin to the pin 4.

16 Claims, 8 Drawing Sheets

Fig. 8

AUDIO INTERFACE ADAPTER DEVICE AND AUDIO SIGNAL RECEIVING APPARATUS

CROSS-REFERENCE TO RELATED APPLICATIONS

The present application is a national phase entry under 35 U.S.C. §371 of International Application No. PCT/CN2012/087889, filed Dec. 28, 2012, which claims priority from Chinese Patent Application No. 201210016852.0, filed on Jan. 18, 2012, both of which are incorporated herein by reference in their entireties.

FIELD

The present disclosure generally relates to an electronic technique field, and more particularly relates to an audio interface adapter device and an audio signal receiving apparatus.

BACKGROUND OF THE INVENTION

An audio interface (such as a headphone socket) of an existing audio signal sending apparatus (such as a mobile communication terminal) and an audio interface of an audio signal receiving apparatus (such as a headphone) generally use a four-section interface, in which a pin 1 and a pin 2 are audio pins, i.e., a left-channel pin and a right-channel pin respectively. However, a pin 3 and a pin 4 of different types of audio interfaces play different roles, that is, there are two types of audio interfaces: the pin 3 is a MIC pin (a microphone pin) and the pin 4 is a GND pin (a ground pin); the pin 3 is a GND pin and the pin 4 is a MIC pin.

As different types of audio interfaces exist, when the audio interface of the audio signal sending apparatus (such as the mobile communication terminal) and the audio interface of the audio signal receiving apparatus (such as the headphone, a headset) do not match, the audio signal sending apparatus can neither communicate with the audio signal receiving apparatus via the MIC pin of the audio interface, nor transmit an audio signal to the audio signal receiving apparatus via the audio pins (i.e., the left-channel pin and the right-channel pin) of the audio interface normally.

BRIEF SUMMARY OF THE INVENTION

The technical problem to be solved by the present disclosure is to overcome the defects of the prior art, and to provide an audio interface adapter device (adapter circuit) and an audio signal receiving apparatus (such as a headphone, a headset, a loudspeaker, an audio signal adapter apparatus, and other audio signal receiving apparatuses receiving an audio signal via an audio pin and processing the audio signal) provided with the audio interface adapter device. The audio interface adapter device can receive the audio signal normally via the audio pin (a left-channel pin, and/or a right-channel pin) of an audio interface when being connected with an audio signal sending apparatus provided with any type of audio interface.

To solve the above problem, the present disclosure provides an audio interface adapter device. The device comprises an audio interface. The audio interface comprises a pin 1, a pin 2, a pin 3 and a pin 4. An audio pin of the audio interface is connected with the pin 3 via a first unidirectional conductive element, and connected with the pin 4 via a second unidirectional conductive element. The audio pin comprises the pin 1 and/or the pin 2. One of the pin 3 and the pin 4 is used as a microphone pin, and the other one of the pin 3 and the pin 4 is used as a ground pin. A conductive direction of the first unidirectional conductive element is from the audio pin to the pin 3, and a conductive direction of the second unidirectional conductive element is from the audio pin to the pin 4.

Furthermore, the pin 1 is connected with the pin 3 via a first signal processing unit and via the first unidirectional conductive element in sequence, and connected with the pin 4 via the first signal processing unit and via the second unidirectional conductive element in sequence; and/or the pin 2 is connected with the pin 3 via a second signal processing unit and via the first unidirectional conductive element in sequence, and connected with the pin 4 via the second signal processing unit and via the second unidirectional conductive element in sequence.

Furthermore, the device further comprises a first bidirectional conductive element. One terminal of the first bidirectional conductive element is connected with the pin 3 and the first unidirectional conductive element respectively, and the other terminal of the first bidirectional conductive element is connected with the pin 4 and the second unidirectional conductive element respectively.

Furthermore, the first bidirectional conductive element is a resistor.

Furthermore, the first unidirectional conductive element is one of a diode, a triode and a MOS transistor, and the second unidirectional conductive element is one of a diode, a triode and a MOS transistor.

Furthermore, the first unidirectional conductive element is a diode D1, an anode of the diode D1 is connected with the audio pin, and a cathode of the diode D1 is connected with the pin 3; and/or the second unidirectional conductive element is a diode D2, an anode of the diode D2 is connected with the audio pin, and a cathode of the diode D2 is connected with the pin 4.

Furthermore, the first unidirectional conductive element is a PNP triode T1, an emitter of the PNP triode T1 is connected with the audio pin, and a base of the PNP triode T1 is connected with the pin 3; and/or the second unidirectional conductive element is a PNP triode T2, an emitter of the PNP triode T2 is connected with the audio pin, and a base of the PNP triode T2 is connected with the pin 4.

Furthermore, the first unidirectional conductive element is an NPN triode T1, a base of the NPN triode T1 is connected with the audio pin, and an emitter of the NPN triode T1 is connected with the pin 3; and/or the second unidirectional conductive element is an NPN triode T2, a base of the NPN triode T2 is connected with the audio pin, and an emitter of the NPN triode T2 is connected with the pin 4.

Furthermore, the first unidirectional conductive element is an N-channel junction MOS transistor F1, a source of the N-channel junction MOS transistor F1 is connected with the audio pin, and a gate of the N-channel junction MOS transistor F1 is connected with the pin 3; and/or the second unidirectional conductive element is an N-channel junction MOS transistor F2, a source of the N-channel junction MOS transistor F2 is connected with the audio pin, and a gate of the N-channel junction MOS transistor F2 is connected with the pin 4.

Furthermore, the first unidirectional conductive element is a P-channel junction MOS transistor F1, a gate of the P-channel junction MOS transistor F1 is connected with the audio pin, and a source of the P-channel junction MOS transistor F1 is connected with the pin 3; and/or the second unidirectional conductive element is a P-channel junction MOS transistor F2, a gate of the P-channel junction MOS transistor F2 is connected with the audio pin, and a source of the P-channel junction MOS transistor F2 is connected with the pin 4.

Furthermore, the first signal processing unit is one of a resistor, a loudspeaker, a transformer, a resistor and a comparator connected in parallel, and a resistor and an operational amplifier connected in parallel; the second signal processing unit is one of a resistor, a loudspeaker, a transformer, a resistor and a comparator connected in parallel, and a resistor and an operational amplifier connected in parallel.

Furthermore, the audio interface is a headphone socket or a headphone jack.

Furthermore, the first unidirectional conductive element and the second unidirectional conductive element are integrated in a single chip.

The present disclosure further provides an audio signal receiving apparatus. The apparatus comprises an audio interface adapter device and an audio signal receiving unit.

The audio interface adapter device comprises an audio interface, a first bidirectional conductive element, a second bidirectional conductive element and a signal processing module, and the audio interface comprises a pin 1, a pin 2, a pin 3 and a pin 4.

The pin 1 is connected with the pin 3 via the first unidirectional conductive element and connected with the pin 4 via the second unidirectional conductive element, the pin 2 is connected with the pin 3 via the first unidirectional conductive element and connected with the pin 4 via the second unidirectional conductive element.

The signal processing module comprises a first signal processing unit, the pin 1 is connected with the pin 3 via the first signal processing unit and via the first unidirectional conductive element in sequence and connected with the pin 4 via the first signal processing unit and via the second unidirectional conductive element in sequence; and/or the signal processing module comprises a second signal processing unit, the pin 2 is connected with the pin 3 via the second signal processing unit and via the first unidirectional conductive element in sequence and connected with the pin 4 via the second signal processing unit and via the second unidirectional conductive element in sequence.

One of the pin 3 and the pin 4 is used as a microphone pin, and the other one of the pin 3 and the pin 4 is used as a ground pin.

A conductive direction of the first unidirectional conductive element is from the audio pin to the pin 3, and a conductive direction of the second unidirectional conductive element is from the audio pin to the pin 4.

The signal processing module comprises one or two of a transformer, a resistor and a comparator connected in parallel, and a resistor and an operational amplifier connected in parallel, in which a secondary coil of the transformer is connected with the audio signal receiving unit, an output terminal of the comparator is connected with the audio signal receiving unit, and an output terminal of the operational amplifier is connected with the audio signal receiving unit.

Furthermore, the audio interface comprises the pin 1 and the pin 2; the signal processing module comprises the first signal processing unit and the second signal processing unit; the pin 1 is connected with the pin 3 via the first signal processing unit and via the first unidirectional conductive element in sequence; the pin 2 is connected with the pin 4 via the second signal processing unit and the second unidirectional conductive element in sequence.

Furthermore, the audio interface adapter device further comprises a first bidirectional conductive element; a first terminal of the first bidirectional conductive element is connected with the pin 3 and the first unidirectional conductive element respectively, and a second terminal of the first bidirectional conductive element is connected with the pin 4 and the second unidirectional conductive element respectively.

Furthermore, the first bidirectional conductive element is a resistor.

Furthermore, the first unidirectional conductive element is one of a diode, a triode, and a MOS transistor, and the second unidirectional conductive element is one of a diode, a triode, and a MOS transistor.

Furthermore, the first bidirectional conductive element is a diode D1, an anode of the diode D1 is connected with the audio pin, and a cathode of the diode D1 is connected with the pin 3; and/or the second unidirectional conductive element is a diode D2, an anode of the diode D2 is connected with the audio pin, and a cathode of the diode D2 is connected with the pin 4.

Furthermore, the first unidirectional conductive element is a PNP triode T1, an emitter of the PNP triode T1 is connected with the audio pin, and a base of the PNP triode T1 is connected with the pin 3; and/or the second unidirectional conductive element is a PNP triode T2, an emitter of the PNP triode T2 is connected with the audio pin, and a base of the PNP triode T2 is connected with the pin 4.

Furthermore, the first unidirectional conductive element is an NPN triode T1, a base of the NPN triode T1 is connected with the audio pin, and an emitter of the NPN triode T1 is connected with the pin 3; and/or the second unidirectional conductive element is an NPN triode T2, a base of the NPN triode T2 is connected with the audio pin, and an emitter of the NPN triode T2 is connected with the pin 4.

Furthermore, the first unidirectional conductive element is an N-channel junction MOS transistor F1, a source of the N-channel junction MOS transistor F1 is connected with the audio pin, and a gate of the N-channel junction MOS transistor F1 is connected with the pin 3; and/or the second unidirectional conductive element is an N-channel junction MOS transistor F2, a source of the N-channel junction MOS transistor F2 is connected with the audio pin, and a gate of the N-channel junction MOS transistor F2 is connected with the pin 4.

Furthermore, the first unidirectional conductive element is a P-channel junction MOS transistor F1, a gate of the P-channel junction MOS transistor F1 is connected with the audio pin, and a source of the P-channel junction MOS transistor F1 is connected with the pin 3; and/or the second unidirectional conductive element is a P-channel junction MOS transistor F2, a gate of the P-channel junction MOS transistor F2 is connected with the audio pin, and a source of the P-channel junction MOS transistor F2 is connected with the pin 4.

Furthermore, the audio interface is a headphone socket or a headphone jack.

Furthermore, the first unidirectional conductive element and the second unidirectional conductive element are integrated in a single chip.

In conclusion, when the audio interface adapter device according to the present disclosure is used, the audio signal receiving apparatus can be connected with the audio signal sending apparatus provided with any type of audio interface, so as to successfully pass the detection performed by the audio signal sending apparatus, and normally receive the audio signal via the audio pin (the left-channel pin, and/or the right-channel pin) of the audio interface.

BRIEF DESCRIPTION OF THE DRAWINGS

In order to explicitly illustrate a technical solution of embodiments of the present disclosure, a brief introduction for the accompanying drawings corresponding to the embodiments will be listed as follows. Apparently, the drawings described below are only corresponding to some embodiments of the present disclosure, and those skilled in the art may obtain other drawings according to these drawings without creative labor.

DETAILED DESCRIPTION

The present disclosure will be described below in detail with reference to drawings and embodiments. Apparently, the described embodiments are only some embodiments of the present disclosure rather than all the embodiments. Other embodiments obtained by those skilled in the art based on the described embodiments without creative labor fall into the scope of the present disclosure.

Figure 1:
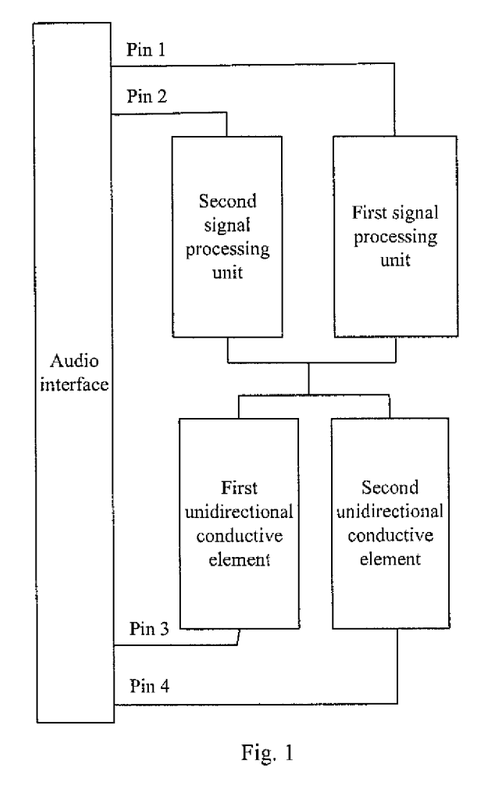
FIG. 1 is a schematic diagram illustrating a principle of the present disclosure.

As shown in FIG. 1, the key point of the present disclosure is to connect an audio pin (a pin 1 and/or a pin 2) of an audio interface to a pin 3 and a pin 4 of the audio interface respectively via an element having an unidirectional conductive property (hereinafter referred to as an unidirectional conductive element, for example, a diode, a triode, or a MOS transistor).

Furthermore, a signal processing module can be connected in series between the audio pin and the unidirectional conductive element. The signal processing module may be a loudspeaker, a primary coil of a transformer, a resistor, etc., and may also be a resistor and a comparator connected in parallel, or a resistor and an operational amplifier connected in parallel.

The present disclosure will be described in detail with reference to drawings and embodiments as follows.

First Embodiment

Figure 2:
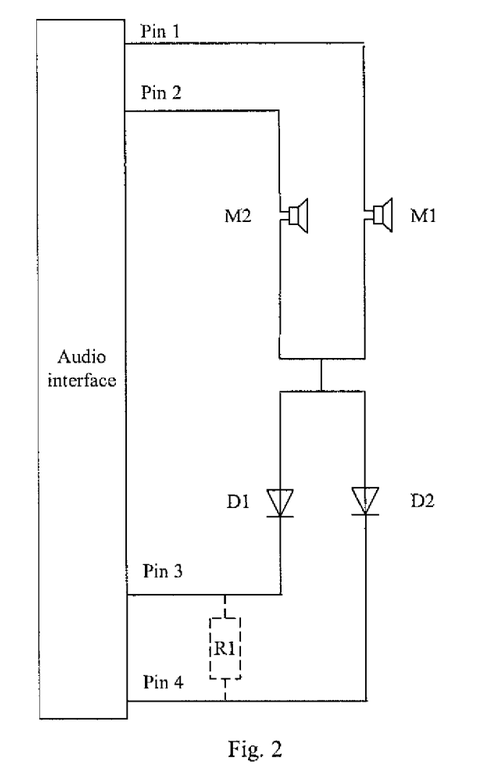
FIG. 2 is a schematic diagram of an audio interface adapter device and an audio signal receiving apparatus according to a first embodiment of the present disclosure.

FIG. 2 is a schematic diagram of an audio interface adapter device and an audio signal receiving apparatus according to a first embodiment of the present disclosure. In this embodiment, the unidirectional conductive element is a diode, and the signal processing module comprises first and second signal processing units which are loudspeakers.

As shown in FIG. 2, in this embodiment, the audio interface adapter device comprises an audio interface, a loudspeaker M1, a loudspeaker M2, a diode D1 and a diode D2.

The audio interface comprises a pin 1, a pin 2, a pin 3 and a pin 4. The pin 1 and the pin 2 are used as an audio pin, and may be a left-channel pin and a right-channel pin respectively. According to different audio interface standards, the pin 3 may be used as an MIC pin and the pin 4 may be used as a ground pin. Alternatively, the pin 3 may be used as the ground pin, and the pin 4 may be used as the MIC pin.

The audio interface of the present disclosure may be any four-section headphone plug or headphone jack, such as the headphone plug or headphone jack with a diameter of 3.5 mm or 2.5 mm.

The pin 1 (the left-channel pin) and the pin 2 (the right-channel pin) of the audio interface are connected with a first end of the loudspeaker M1 and a first end of the loudspeaker M2 respectively, a second end of the loudspeaker M1 and a second end of the loudspeaker M2 are connected with an anode of the diode D1 and an anode of the diode D2, a cathode of the diode D1 and a cathode of the diode D2 are connected with the pin 3 and the pin 4 of the audio interface respectively.

Each of the diode D1 and the diode D2 may be a germanium diode.

When the audio interface of the present disclosure is the headphone plug, the audio signal receiving apparatus of the present disclosure can be inserted into a headphone jack of an audio signal sending apparatus (for example, a smart phone) directly. When the audio interface of the present disclosure is the headphone jack, the audio signal receiving apparatus of the present disclosure can be connected with the headphone jack of the smart phone via an adapter cable having two headphone plugs at two ends thereof.

The audio signal receiving apparatus using the audio interface adapter device of the present disclosure may be a headphone, a headset, a loudspeaker, etc.

When the audio signal receiving apparatus provided with the above audio interface adapter device is connected with the audio signal sending apparatus, no matter what type of the pin 3 and the pin 4 of the audio interface of the audio signal sending apparatus is, the audio signal receiving apparatus can pass the detection and identification performed for the pin 1 and the pin 2 (i.e. the audio pin) by the audio signal sending device successfully, and receive and process the audio signal using the pin 1 and the pin 2 normally.

Alternatively, in this embodiment, the pin 3 and the pin 4 can be connected via a bidirectional conductive element, for example, a resistor R1. A resistance of the above bidirectional conductive element ranges from 7.7KΩ to 15KΩ, and generally is 10 KΩ, 12 KΩ or 15 KΩ.

When the pin 3 and the pin 4 are connected via the bidirectional conductive element (for example, the resistor), the audio signal receiving apparatus of the present disclosure can pass the detection and identification for the MIC pin by the audio signal sending apparatus successfully.

Second Embodiment

Figure 3:
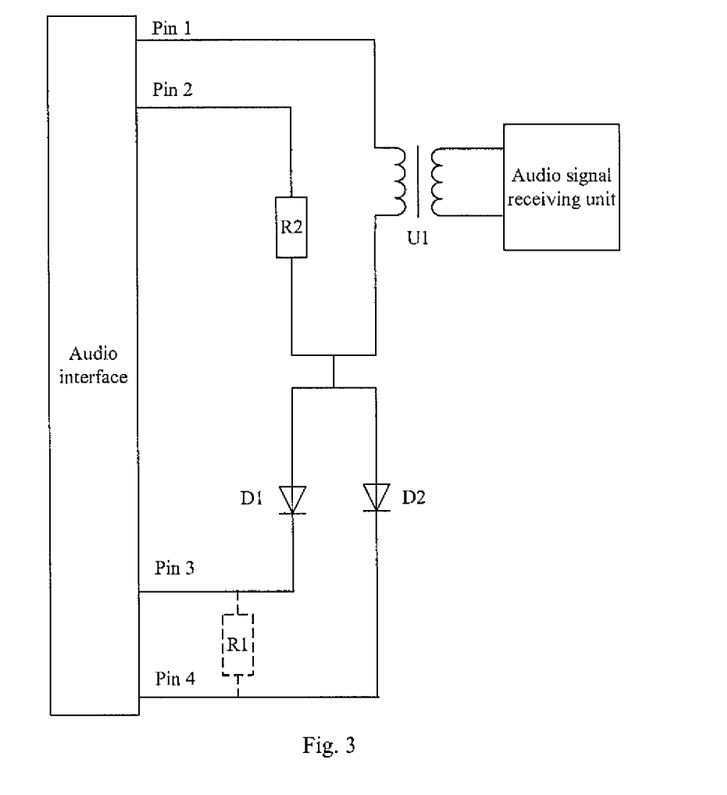
FIG. 3 is a schematic diagram of an audio interface adapter device and an audio signal receiving apparatus according to a second embodiment of the present disclosure.

FIG. 3 is a schematic diagram of an audio interface adapter device and an audio signal receiving apparatus according to a second embodiment of the present disclosure. In this embodiment, the unidirectional conductive element is a diode, and the signal processing module comprises first and second signal processing units which are a resistor and a transformer U1 respectively.

The difference between the second embodiment and the first embodiment is a different type of signal processing module. In this embodiment, the signal processing unit connected with the pin 1 (or the pin 2) of the audio interface is the transformer, and the signal processing unit connected with the pin 2 (or the pin 1) of the audio interface is a resistor R2. The resistance of the resistor R2 is above 4Ω, and generally is 8Ω, 16Ω, or 32Ω.

The pin 1 of the audio interface is connected with a first end of a primary coil of the transformer, and a second end of the primary coil is connected with the anode of the diode D1 and the anode of the diode D2 respectively.

The audio signal receiving apparatus using the audio interface adapter device of this embodiment may further comprise an audio signal receiving unit. The audio signal receiving unit is connected with two ends of a secondary coil of the transformer, and configured to receive and an amplified audio signal and to process the amplified audio signal.

Certainly, the pin 1 and the pin 2 of the audio interface in this embodiment can be connected with the transformer U1 and a transformer U2 respectively. Two ends of the secondary coil of the transformer U1 and two ends of the secondary coil of the transformer U2 can be connected with one audio signal receiving unit or connected with two audio signal receiving units respectively.

Third Embodiment

Figure 4:
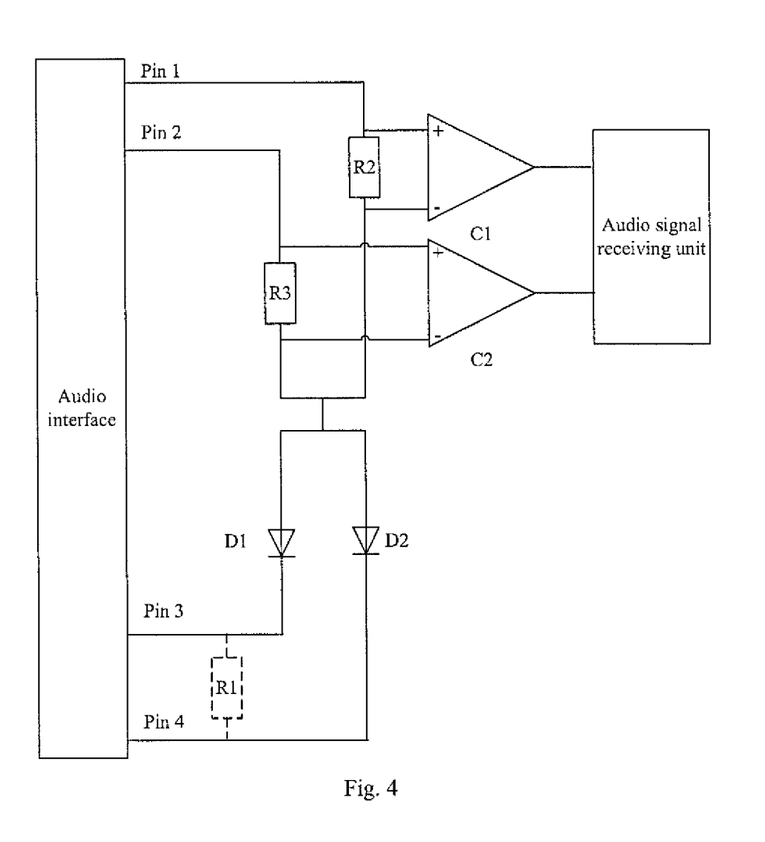
FIG. 4 is a schematic diagram of an audio interface adapter device and an audio signal receiving apparatus according to a third embodiment of the present disclosure.

FIG. 4 is a schematic diagram of an audio interface adapter device and an audio signal receiving apparatus according to a third embodiment of the present disclosure. In this embodiment, the unidirectional conductive element is a diode, the signal processing module comprises first and second signal processing units, and each of the first and second signal processing units comprises a resistor and a comparator connected in parallel.

The difference between the third embodiment and the first embodiment is a different type of signal processing module. In this embodiment, the signal processing unit connected with the pin 1 of the audio interface comprises a resistor R2 and a comparator C1 connected in parallel, and the signal processing unit connected with the pin 2 of the audio interface comprises a resistor R3 and a comparator C2 connected in parallel.

The pin 1 is connected with a first terminal of the resistor R2 and a first input terminal (for example, a positive terminal) of the comparator C1, and a second terminal of the resistor R2 and a second input terminal (for example, a negative terminal) of the comparator C1 are connected with the anode of the diode D1 and the anode of the diode D2.

The pin 2 is connected with a first terminal of the resistor R3 and a first input terminal (for example, a positive terminal) of the comparator C2 respectively, and a second terminal of the resistor R3 and a second input terminal (for example, a negative terminal) of the comparator C2 are connected with the anode of the diode D1 and the anode of the diode D2.

The audio signal receiving apparatus using the audio interface adapter device of this embodiment may further comprise an audio signal receiving unit. The audio signal receiving unit is connected with an output terminal of the comparator C1 and an output terminal of the comparator C2 respectively, and configured to receive and process the audio signal processed by the comparator.

Furthermore, alternatively, the comparator in this embodiment may be an operational amplifier.

Fourth Embodiment

Figure 5:
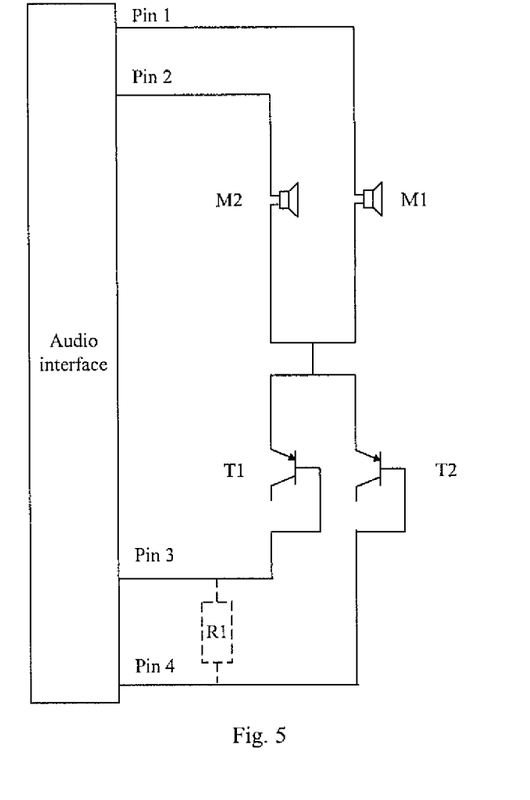
FIG. 5 is a schematic diagram of an audio interface adapter device and an audio signal receiving apparatus according to a fourth embodiment of the present disclosure.

FIG. 5 is a schematic diagram of an audio interface adapter device and an audio signal receiving apparatus according to a fourth embodiment of the present disclosure. In this embodiment, the unidirectional conductive element is a PNP triode, and the signal processing module comprises first and second signal processing units which are loudspeakers.

The difference between the fourth embodiment and the first embodiment is a different unidirectional conductive element. In this embodiment, the unidirectional conductive elements comprise a triode T1 and a triode T2.

An emitter of the triode T1 is connected with the pin 1 via a loudspeaker M1 and connected with the pin 2 via a loudspeaker M2, and a base of the triode T1 is connected with the pin 3.

An emitter of the triode T2 is connected with the pin 1 via the loudspeaker M1 and connected with the pin 2 via the loudspeaker M2, and a base of the triode T2 is connected with the pin 4.

Collectors of the triode T1 and the triode T2 can be suspended.

Furthermore, alternatively, the fourth embodiment is similar to the second embodiment and the third embodiment, and the first signal processing unit (the loudspeaker M1) and the second signal processing unit (the loudspeaker M2) in this embodiment may be the resistor and the transformer U1 respectively, or be the signal processing unit comprising a resistor and a comparator connected in parallel.

Figure 6:
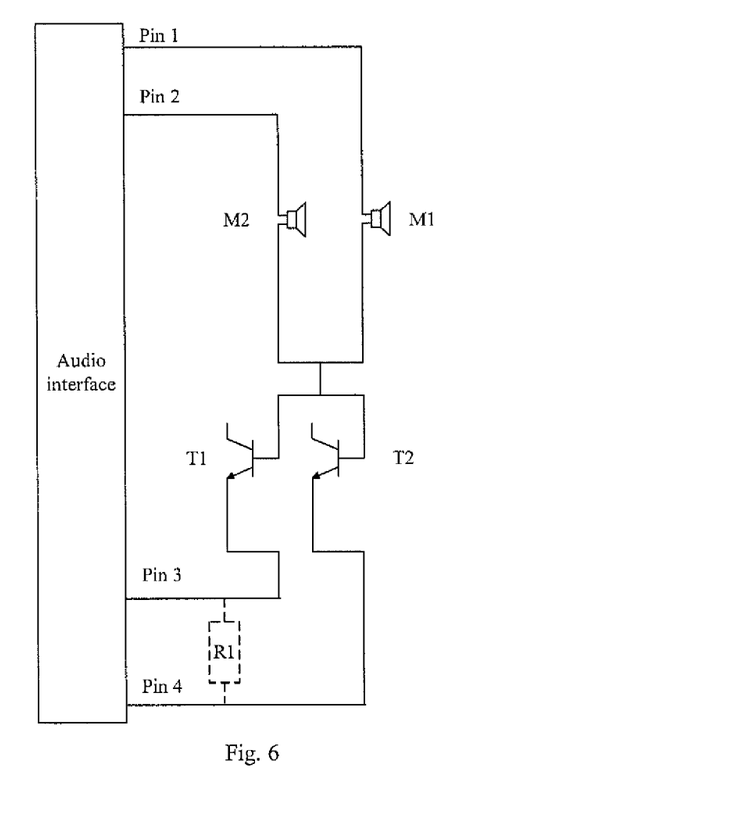
FIG. 6 is a schematic diagram of an audio interface adapter device and an audio signal receiving apparatus according to a fifth embodiment of the present disclosure.

FIG. 6 is a schematic diagram of an audio interface adapter device and an audio signal receiving apparatus according to a fifth embodiment of the present disclosure. In this embodiment, the unidirectional conductive element is an NPN triode, and the signal processing module comprises first and second signal processing units which are loudspeakers.

Fifth Embodiment

FIG. 6 is a schematic diagram of an audio interface adapter device and an audio signal receiving apparatus according to a fifth embodiment of the present disclosure. In this embodiment, the unidirectional conductive element is an NPN triode, and the signal processing module comprises first and second signal processing units which are microphones.

The difference between the fifth embodiment and the first embodiment is a different unidirectional conductive element. In this embodiment, the unidirectional conductive elements comprise a triode T1 and a triode T2.

A base of the triode T1 is connected with the pin 1 via the loudspeaker M1 and connected with the pin 2 via the loudspeaker M2, and an emitter of the triode T1 is connected with the pin 3.

A base of the triode T2 is connected with the pin 1 via the loudspeaker M1 and connected with the pin 2 via the loudspeaker M2, and an emitter of the triode T2 is connected with the pin 4.

Collectors of the triode T1 and the triode T2 can be suspended.

Furthermore, alternatively, the fifth embodiment is similar to the second embodiment and the third embodiment, and the first signal processing unit (the loudspeaker M1) and the second signal processing unit (the loudspeaker M2) in this embodiment may be the resistor and the transformer U1 respectively, or be the signal processing unit comprising a resistor and a comparator connected in parallel.

Sixth Embodiment

Figure 7:
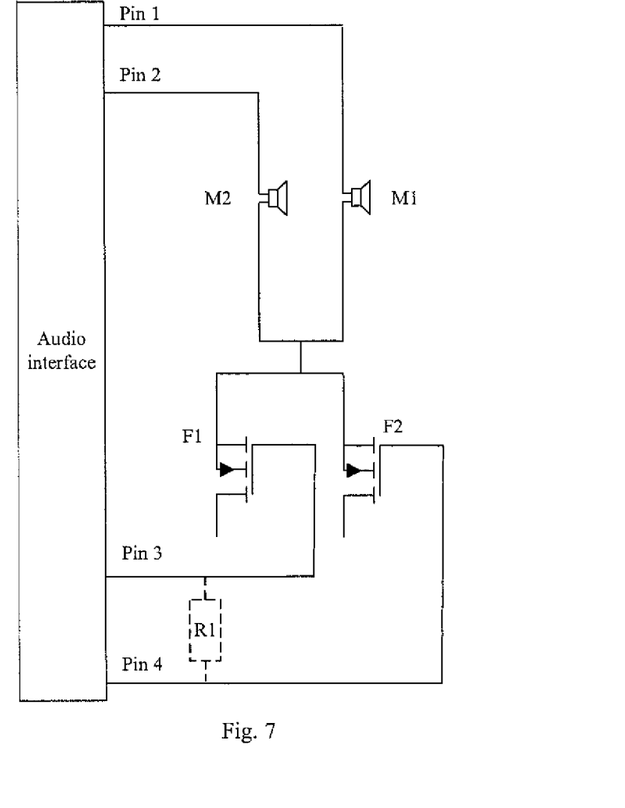
FIG. 7 is a schematic diagram of an audio interface adapter device and an audio signal receiving apparatus according to a sixth embodiment of the present disclosure.

FIG. 7 is a schematic diagram of an audio interface adapter device and an audio signal receiving apparatus according to a sixth embodiment of the present disclosure. In this embodiment, the unidirectional conductive element is an N-channel junction MOS transistor, and the signal processing module comprises first and second signal processing units which are loudspeakers.

The difference between the sixth embodiment and the first embodiment is a different unidirectional conductive element. In this embodiment, the unidirectional conductive elements comprise a MOS transistor F1 and a MOS transistor F2.

A source of the MOS transistor F1 is connected with the pin 1 via the loudspeaker M1 and connected with the pin 2 via the loudspeaker M2, and a gate of the MOS transistor F1 is connected with the pin 3.

A source of the MOS transistor F2 is connected with the pin 1 via the loudspeaker M1 and connected with the pin 2 via the loudspeaker M2, and a gate of the MOS transistor F2 is connected with the pin 4.

Drains of the MOS transistor F1 and the MOS transistor F2 can be suspended.

Furthermore, alternatively, the sixth embodiment is similar to the second embodiment and the third embodiment, and the first signal processing unit (the loudspeaker M1) and the second signal processing unit (the loudspeaker M2) in this embodiment may be the resistor and the transformer U1 respectively, or be the signal processing unit comprising a resistor and a comparator connected in parallel.

Seventh Embodiment

Figure 8:
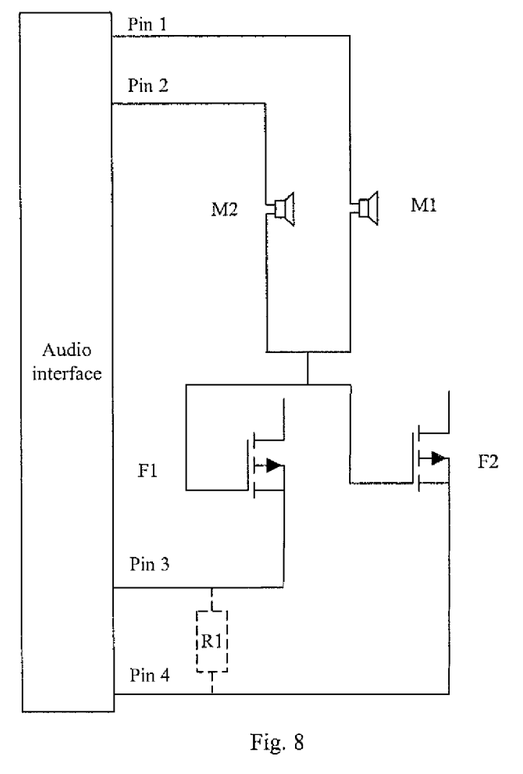
FIG. 8 is a schematic diagram of an audio interface adapter device and an audio signal receiving apparatus according to a seventh embodiment of the present disclosure.

FIG. 8 is a schematic diagram of an audio interface adapter device and an audio signal receiving apparatus according to a seventh embodiment of the present disclosure. In this embodiment, the unidirectional conductive element is a P-channel junction MOS transistor, and the signal processing module comprises first and second signal processing units which are loudspeakers.

The difference between the seventh embodiment and the first embodiment is a different unidirectional conductive element. In this embodiment, the unidirectional conductive elements comprise a MOS transistor F1 and a MOS transistor F2.

A gate of the MOS transistor F1 is connected with the pin 1 via the loudspeaker M1 and connected with the pin 2 via the loudspeaker M2, and a source of the MOS transistor F1 is connected with the pin 3.

A gate of the MOS transistor F2 is connected with the pin 1 via the loudspeaker M1 and connected with the pin 2 via the loudspeaker M2, and a source of the MOS transistor F2 is connected with the pin 4.

Drains of the MOS transistor F1 and the MOS transistor F2 can be suspended.

Furthermore, alternatively, the seventh embodiment is similar to the second embodiment and the third embodiment, and the first signal processing unit (the loudspeaker M1) and the second signal processing unit (the loudspeaker M2) in this embodiment may be the resistor and the transformer U1 respectively, or be the signal processing unit comprising a resistor and a comparator connected in parallel.

According to the principle of the present disclosure, there may be other variants of the above embodiments as follows.

The first unidirectional conductive element and the second unidirectional conductive element may be different types of elements, for example, the first unidirectional conductive element is a diode, and the second unidirectional conductive element is a triode.

In the above embodiments, the pin 1 and the pin 2 of the audio interface are connected with the signal processing units via unidirectional conductive elements respectively. Alternatively, one of the pin 1 and the pin 2 is connected with the unidirectional conductive elements via the signal processing unit, and the other one of the pin 1 and the pin 2 is connected with the unidirectional conductive elements directly.

Certainly, the first unidirectional conductive element and the second unidirectional conductive element can be integrated in a single chip, for example, the BAT54 chip.

Although explanatory embodiments have been shown and described above, they are not construed to limit the present disclosure. Any changes, alternatives, and modifications made within the technical scope of the present disclosure by those skilled in the art should be included within the protection scope of the present disclosure which is defined by the protection scope of the claims.

The invention claimed is:

1. An audio interface adapter device, comprising an audio interface, wherein the audio interface comprises a pin 1, a pin 2, a pin 3 and a pin 4,
   the pin 1 and/or the pin 2 is used as an audio pin of the audio interface;
   one of the pin 3 and the pin 4 is used as a microphone pin, and the other one of the pin 3 and the pin 4 is used as a ground pin;
   the pin 1 is connected with the pin 3 via a first signal processing unit and via a first unidirectional conductive element in sequence, and connected with the pin 4 via the first signal processing unit and via a second unidirectional conductive element in sequence; and/or the pin 2 is connected with the pin 3 via a second signal processing unit and via the first unidirectional conductive element in sequence, and connected with the pin 4 via the second signal processing unit and via the second unidirectional conductive element in sequence;
   a conductive direction of the first unidirectional conductive element is from the audio pin to the pin 3;
   a conductive direction of the second unidirectional conductive element is from the audio pin to the pin 4.

2. The device according to claim 1, wherein
   the device further comprises a first bidirectional conductive element;
   a first terminal of the first bidirectional conductive element is connected with the pin 3 and the first unidirectional conductive element respectively, and a second terminal of the first bidirectional conductive element is connected with the pin 4 and the second unidirectional conductive element respectively.

3. The device according to claim 2, wherein
   the first bidirectional conductive element is a resistor.

4. The device according to claim 1, wherein
   the first unidirectional conductive element is one of a diode, a triode and a MOS transistor;
   the second unidirectional conductive element is one of a diode, a triode and a MOS transistor.

5. The device according to claim 1, wherein
   the first unidirectional conductive element is a diode D1, an anode of the diode D1 is connected with the audio pin, and a cathode of the diode D1 is connected with the pin 3; and/or the second unidirectional conductive element is a diode D2, an anode of the diode D2 is connected with the audio pin, and a cathode of the diode D2 is connected with the pin 4, or wherein the first unidirectional conductive element is a PNP triode T1, an emitter of the PNP triode T1 is connected with the audio pin, and a base of the PNP triode T1 is connected with the pin 3; and/or the second unidirectional conductive element is a PNP triode T2, an emitter of the PNP triode T2 is connected with the audio pin, and a base of the PNP triode T2 is connected with the pin 4, or wherein the first unidirectional conductive element is an NPN triode T1, a base of the NPN triode T1 is connected with the audio pin, and an emitter of the NPN triode T1 is connected with the pin 3; and/or the second unidirectional conductive element is an NPN triode T2, a base of the NPN triode T2 is connected with the audio pin, and an emitter of the NPN triode T2 is connected with the pin 4, or wherein the first unidirectional conductive element is an N-channel junction MOS transistor F1, a source of the N-channel junction MOS transistor F1 is connected with the audio pin, and a gate of the N-channel junction MOS transistor F1 is connected with the pin 3; and/or the second unidirectional conductive element is an N-channel junction MOS transistor F2, a source of the N-channel junction MOS transistor F2 is connected with the audio pin, and a gate of the N-channel junction MOS transistor F2 is connected with the pin 4, or wherein the first unidirectional conductive element is a P-channel junction MOS transistor F1, a gate of the P-channel junction MOS transistor F1 is connected with the audio pin, and a source of the P-channel junction MOS transistor F1 is connected with the pin 3; and/or the second unidirectional conductive element is a P-channel junction MOS transistor F2, a gate of the P-channel junction MOS transistor F2 is connected with the audio pin, and a source of the P-channel junction MOS transistor F2 is connected with the pin 4.

6. The device according to claim 1, wherein the first signal processing unit is one of a resistor, a loudspeaker, a transformer, a resistor and a comparator connected in parallel, and a resistor and an operational amplifier connected in parallel;

the second signal processing unit is one of a resistor, a loudspeaker, a transformer, a resistor and a comparator connected in parallel, and a resistor and an operational amplifier connected in parallel.

7. The device according to claim 1, wherein the audio interface is a headphone socket or a headphone jack.

8. The device according to claim 1, wherein the first unidirectional conductive element and the second unidirectional conductive element are integrated in a single chip.

9. An audio signal receiving apparatus, comprising an audio interface adapter device and an audio signal receiving unit, wherein the audio interface adapter device comprises an audio interface, a first bidirectional conductive element, a second bidirectional conductive element and a signal processing module, and the audio interface comprises a pin 1, a pin 2, a pin 3 and a pin 4;

the signal processing module comprises a first signal processing unit, the pin 1 is connected with the pin 3 via the first signal processing unit and via the first unidirectional conductive element in sequence and connected with the pin 4 via the first signal processing unit and via the second unidirectional conductive element in sequence; and/or the signal processing module comprises a second signal processing unit, the pin 2 is connected with the pin 3 via the second signal processing unit and via the first unidirectional conductive element in sequence and connected with the pin 4 via the second signal processing unit and via the second unidirectional conductive element in sequence;

one of the pin 3 and the pin 4 is used as a microphone pin, and the other one of the pin 3 and the pin 4 is used as a ground pin;

the pin 1 and/or the pin 2 is used as an audio pin of the audio interface;

a conductive direction of the first unidirectional conductive element is from the audio pin to the pin 3, and a conductive direction of the second unidirectional conductive element is from the audio pin to the pin 4;

the signal processing module comprises one or two of a transformer, a resistor and a comparator connected in parallel, and a resistor and an operational amplifier connected in parallel, in which a secondary coil of the transformer is connected with the audio signal receiving unit, an output terminal of the comparator is connected with the audio signal receiving unit, and an output terminal of the operational amplifier is connected with the audio signal receiving unit.

10. The apparatus according to claim 9, wherein the audio interface comprises the pin 1 and the pin 2;

the signal processing module comprises the first signal processing unit and the second signal processing unit;

the pin 1 is connected with the pin 3 via the first signal processing unit and via the first unidirectional conductive element in sequence;

the pin 2 is connected with the pin 4 via the second signal processing unit and the second unidirectional conductive element in sequence.

11. The apparatus according to claim 9, wherein the audio interface adapter device further comprises a first bidirectional conductive element;

a first terminal of the first bidirectional conductive element is connected with the pin 3 and the first unidirectional conductive element respectively, and a second terminal of the first bidirectional conductive element is connected with the pin 4 and the second unidirectional conductive element respectively.

12. The apparatus according to claim 9, wherein the first bidirectional conductive element is a resistor.

13. The apparatus according to claim 9, wherein the first unidirectional conductive element is one of a diode, a triode, and a MOS transistor;

the second unidirectional conductive element is one of a diode, a triode, and a MOS transistor.

14. The apparatus according to claim 9, wherein the first bidirectional conductive element is a diode D1, an anode of the diode D1 is connected with the audio pin, and a cathode of the diode D1 is connected with the pin 3; and/or the second unidirectional conductive element is a diode D2, an anode of the diode D2 is connected with the audio pin, and a cathode of the diode D2 is connected with the pin 4, or wherein
the first unidirectional conductive element is a PNP triode T1, an emitter of the PNP triode T1 is connected with the audio pin, and a base of the PNP triode T1 is connected with the pin 3; and/or
the second unidirectional conductive element is a PNP triode T2, an emitter of the PNP triode T2 is connected with the audio pin, and a base of the PNP triode T2 is connected with the pin 4, or
wherein
the first unidirectional conductive element is an NPN triode T1, a base of the NPN triode T1 is connected with the audio pin, and an emitter of the NPN triode T1 is connected with the pin 3; and/or
the second unidirectional conductive element is an NPN triode T2, a base of the NPN triode T2 is connected with the audio pin, and an emitter of the NPN triode T2 is connected with the pin 4, or
the first unidirectional conductive element is an N-channel junction MOS transistor F1, a source of the N-channel junction MOS transistor F1 is connected with the audio pin, and a gate of the N-channel junction MOS transistor F1 is connected with the pin 3; and/or
the second unidirectional conductive element is an N-channel junction MOS transistor F2, a source of the N-channel junction MOS transistor F2 is connected with the audio pin, and a gate of the N-channel junction MOS transistor F2 is connected with the pin 4, or
wherein
the first unidirectional conductive element is a P-channel junction MOS transistor F1, a gate of the P-channel junction MOS transistor F1 is connected with the audio pin, and a source of the P-channel junction MOS transistor F1 is connected with the pin 3; and/or
the second unidirectional conductive element is a P-channel junction MOS transistor F2, a gate of the P-channel junction MOS transistor F2 is connected with the audio pin, and a source of the P-channel junction MOS transistor F2 is connected with the pin 4.

15. The apparatus according to claim 9, wherein
the audio interface is a headphone socket or a headphone jack.

16. The apparatus according to claim 9, wherein the first unidirectional conductive element and the second unidirectional conductive element are integrated in a single chip.

* * * * *